United States Patent [19]

Merges

[11] Patent Number: 5,038,674
[45] Date of Patent: Aug. 13, 1991

[54] SOLAR VENTILATION ARRANGEMENT FOR PASSENGER COMPARTMENTS

[75] Inventor: Veit Merges, Putzbrunn, Fed. Rep. of Germany

[73] Assignee: Phototronics Solartechnik GmbH, Fed. Rep. of Germany

[21] Appl. No.: 608,287

[22] Filed: Nov. 2, 1990

[30] Foreign Application Priority Data

Nov. 17, 1989 [DE] Fed. Rep. of Germany ....... 3938259

[51] Int. Cl.$^5$ .............................................. B60H 1/26
[52] U.S. Cl. .................................... 98/2.02; 98/2.14; 98/900
[58] Field of Search ................ 98/2.01, 2.02, 2.14, 98/900

[56] References Cited

U.S. PATENT DOCUMENTS

| 4,395,939 | 8/1983 | Hough et al. | 98/2.14 |
| 4,741,256 | 5/1988 | Huang | 98/2.14 |

FOREIGN PATENT DOCUMENTS

| 256313 | 2/1988 | European Pat. Off. | 98/2.14 |
| 2543664 | 10/1984 | France | 98/2.18 |
| 57013 | 4/1984 | Japan | 98/2.14 |
| 57014 | 4/1985 | Japan | 98/2.14 |
| 293220 | 11/1989 | Japan | 98/2.02 |

*Primary Examiner*—Harold Joyce
*Attorney, Agent, or Firm*—Evenson, Wands, Edwards, Lenahan & McKeown

[57] ABSTRACT

An arrangement for ventilating the passenger compartment of a motor vehicle having a hinged roof cover, having one or several electric fans as well as a solar module integrated into the roof cover. The fans are constructed as axial-flow fans and are arranged in the area below the rear transverse edge of the roof cover. The axial-flow fans are coupled kinematically with the roof cover and its frame in such a manner that, when the roof cover is raised, they are swivelled in a forced manner into an effective position in the air gaps and, when the roof cover is closed, are swivelled into an ineffective position inside the roof recess without significantly reducing the headroom. The solar module which covers the roof cover for the most part is constructed in the semiconductor thin-film technique and, in a locally limited manner, has a transparency for the incident sunlight.

30 Claims, 1 Drawing Sheet

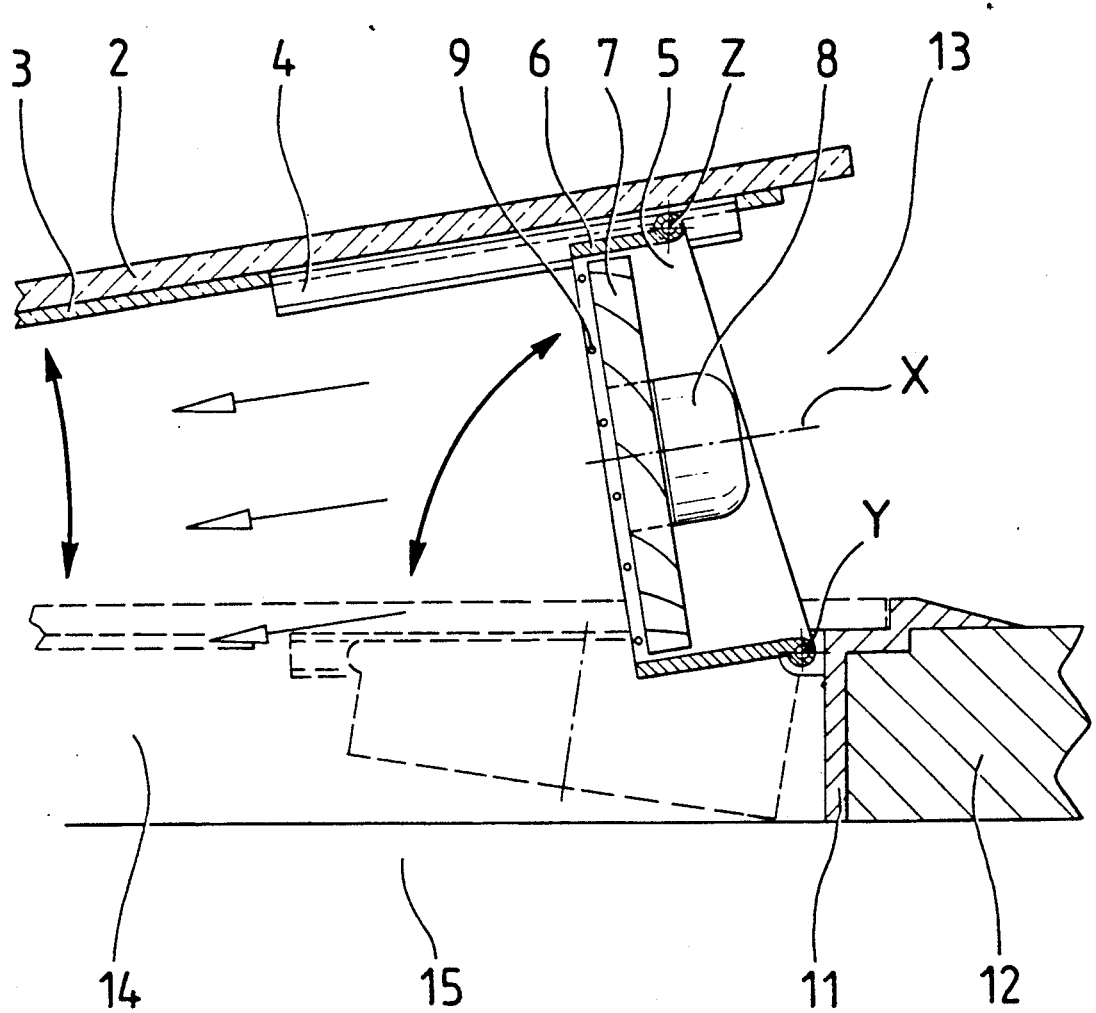

SOLAR VENTILATION ARRANGEMENT FOR PASSENGER COMPARTMENTS

BACKGROUND AND SUMMARY OF THE INVENTION

The invention relates to an arrangement for ventilating the passenger compartment of a motor vehicle, particularly a passenger car, having a hinged, or hinged and slidable roof cover of the passenger compartment, having at least one electrically drivable fan in the area of the roof for the supply of outside air into the interior of the passenger compartment, as well as having a solar module integrated into the roof cover for the at least one fan.

This type of an arrangement is known, for example, from the German Patent Document DE-OS 36 43 436 and essentially comprises—at least—one fan having an electric driving motor; a solar module which supplies the driving motor of the fan with electric energy, as well as a supporting element for the solar module and the fan which covers a wall opening of the vehicle and—in addition to its function as the supporting element—also serves another purpose. As examples of such supporting elements, the sliding roof or the sun roof of a vehicle are mentioned, among others. As a preferred embodiment, an arrangement is described in which the fan takes in cooler outside air and blows it into the passenger compartment along the shortest path (see claims 9 to 11, FIGS. 5 and 6). By means of flow guiding elements, the air current may be aimed in a targeted manner at parts which are subjected to particularly high heating when the vehicle is not moving, such as the dashboard and the steering wheel. The fan is designed as a crossflow or transverse-flow fan, the housing of which projects beyond the plane of the roof and has an intake opening facing the rear of the vehicle.

The above-described principle of the direct blowing-in of fresh air is indeed advantageous because the fresh air does not first—as in the case of the taking-in of hot air in the roof area—have to flow through the flow-impairing ducts of the series-produced existing heating system in the area of the engine space. It is also advantageous that particularly hot parts or operating elements, which are subjected to direct sun radiation, may be cooled in a targeted manner and that the heated air can escape in the intended direction through the existing venting ducts from the passenger compartment.

It is also advantageous in the described arrangement that, as a result of the low space requirement of the crossflow or transverse-flow fan as well as its position largely above and in the plane of the roof, the passengers' head room is virtually not restricted.

It is a disadvantage of the described arrangement that the fan housing projects out of the outer contour of the vehicle also during the drive and thus interferes with the aerodynamics and the visual appearance of the vehicle.

However, another significant disadvantage is the poor fluidic efficiency of the selected fan construction (crossflow or transverse-flow fan). According to today's particularly attractive state of the thin-film technique, a solar module can be housed on the relatively small surface of the sun roof or sliding roof which, in the case of a sun radiation of 500 W/m$^2$ (European conditions) calculated to a perpendicular incidence, results in electrical power of approximately 10 W. An expansion of the solar module to other vehicle body surfaces, as a rule, is not considered useful, one of the reasons being that of retrofitting. Tests on passenger cars have shown that, for the ventilation and cooling to be sufficient when the vehicle is subjected to sun radiation and is not moving, a rate of air flow in the order to 200 m$^3$/h is required. This rate of air flow—even if the motor has a maximal design—cannot be achieved by means of the low solar output of 10 W and a fan constructed as a crossflow or transverse-flow blower.

It is known that axial-flow fans operate at a much higher efficiency than, for example, crossflow fans. All solutions using axial-flow fans which have become known for the present purpose, for example, according to the German Patent Documents DE-OS 36 33 495 or DE-OS 35 40 546, have considerable disadvantages which stand in the way of a successful practical application. They limit, for example, the useful solar surface or the passengers' headroom or are unacceptable for aerodynamic and aesthetic reasons.

The solar roofs which are currently offered particularly as a replacement of transparent sun roofs also impair the driving comfort in that they are not transparent in the area of the solar module or are transparent only for a certain wavelength spectrum. Thus, there are solar modules made of amorphous silicon with nonmetallic rear electrodes which are transparent only for red tones.

In view of the disadvantages of the solutions according to the state of the art, it is an object of the invention to provide an arrangement for ventilating the passenger compartment of a motor vehicle which permits an efficient cooling of the passenger compartment heated by sun radiation by utilizing photo-voltaically generated electric energy in which case the surface which is available to the solar module is utilized as well as possible and the fluidic conditions are optimized by a suitable selection of the type and arrangement of fans and which does not have any negative influence on the driving comfort, particularly the passengers' headroom as well as the light conditions in the passenger compartment, nor on the outside appearance of the vehicle.

This object is achieved by means of the combination of characteristics:

wherein the at least one fan is constructed as an axial-flow fan and is arranged in the area below the rear transverse edge of the roof cover with respect to the normal driving direction, wherein the at least one axial-flow fan is kinematically coupled with the roof cover and with the frame carrying the roof cover in such a manner that, when the roof cover is raised, they are swivelled in a forced manner into an effective position in the opening between the roof cover and the frame, and when the roof cover is lowered, are forced into an ineffective position inside the roof recess formed by the roof cover and its frame, each fan axis extending approximately parallel to the plane of the roof cover in the effective position, and extending approximately perpendicular with respect to it in the ineffective position, and wherein the solar module covering the surface of the roof cover at least for the most part is constructed as a semiconductor thin-film which has a transparency for the incident sunlight into the interior of the passenger compartment in at least a locally limited manner.

The surface of the roof cover which consists, as a rule, of glass can practically be utilized completely for the housing of the solar module since the fan or fans are linked only to the roof cover, but are not integrated into it. The solar module which is constructed in the semiconductor thin-film technique, in a locally restricted manner, has a transparency for the incident sun light, preferably at many uniformly distributed points (perforation) and thus provides similar lighting conditions as a conventional sun roof which is locally imprinted against excessive sun radiation. The fan or fans are constructed as axial-flow fans—with an optimal efficiency—and are arranged below the rear transverse edge of the roof cover, that is, in the area of the largest roof opening when the cover is raised. Thus, the fans do not project out of the vehicle contour in a disturbing manner in any of the positions.

The optimizing of the flow conditions and of the space requirement is achieved by the fact that the fans can be moved, for example, swivelled between an effective and an ineffective position. For this purpose, they are kinematically connected with the roof cover and its frame and, when the roof cover is swivelled, are forced along with it. The effective position (fan axis is approximately in parallel to the plane of the roof cover) leads to a targeted, low-resistance course of flow; the ineffective position (fan axis is approximately vertical with respect to the plane of the roof cover) permits a low space requirement within the roof recess formed by the frame of the roof cover.

Other objects, advantages and novel features of the present invention will become apparent from the following detailed description of the invention when considered in conjunction with the accompanying drawings.

BRIEF DESCRIPTION OF THE DRAWINGS

The single drawing figure is a very simplified schematic partial longitudinal sectional view of an arrangement constructed according to a preferred embodiment of the invention.

DETAILED DESCRIPTION OF THE DRAWINGS

The arrangement 1 is inserted into the roof 12 of a motor vehicle, preferably of a passenger car. The motor vehicle roof 12 is provided with an opening into which a frame 11 is inserted. If the arrangement 1 according to the invention is the first lifting roof installed into the corresponding vehicle, the frame 11 is designed specifically for the arrangement 1. If a conventional lifting roof or lifting/sliding roof had already existed in the vehicle, its frame may be maintained, in which case, correspondingly, the remaining components of the arrangement 1 must be adapted to the frame in order to be able to be installed within a short time with acceptable mounting expenditures.

For reasons of simplicity, the frame 11 and the motor vehicle roof 12 are shown as solid metal parts, in which case it is clear that actual constructions, as a rule, have a more complex composition (sheet-metal roof, plastic ceiling, insulating materials, sealing devices, etc.).

At least the roof cover 2 and the axial-flow fan or fans 5 are movable elements of the arrangement 1. The shown roof cover 2 can be swivelled around a transverse shaft which is situated in the front in the driving direction and is not visible in the figure, between the open position-shown by a drawn-out solid line—and the close position—shown by an interrupted dashed line. In addition, it is possible to make then mentioned transverse shaft and thus the roof cover itself additionally slidable in the longitudinal direction of the vehicle. The roof cover 2 consists of arched glass (which for reasons of simplicity is illustrated to be plane). A photovoltaically effective thin film 3 with electrodes, connections and possibly thin support glass is applied to the bottom side of the roof cover. This thin film covers a part of the surface of the roof cover 2 that is as large as possible and, with respect to the semiconductor material, consists preferably of amorphous silicon. If metallic rear electrodes are used, the thin film 1 is impervious to light. In order not to lose the characteristic of the transparency which is well-liked in the case of conventional motor vehicle sun roofs, the thin film 3 is interrupted at many points, the areal proportion of the breakthroughs amounting to approximately 10–30%. If the breakthroughs are sufficiently small and uniformly distributed over the surface, the roof cover 2 makes a uniformly transparent impression. It is also contemplated to concentrate the breakthroughs in certain areas (for example, the edge, the center) or to vary their size and shape in order to implement optical effects in a targeted manner.

In the raised condition, the roof cover 2 exposes an opening between itself and the upper edge of the frame 11 having two wedge-shaped lateral areas and a rectangular rear area. In the present case, the latter is used for supplying cooler ambient air into the passenger compartment 15 by means of solar energy. For this purpose, one axial-flow fan 5, preferably several axial-flow fans 5 are movably arranged in this area. An exemplary configuration is contemplated with four identical, symmetrically distributed axial-flow fans having a power consumption of 2.5 W respectively ($4 \times 2.5 = 10$ W). Each axial-flow fan 5, for example, has an annular fan housing 6 in which the fan wheel 7 and the electrical driving motor 8 are housed. The grid 9, on the side of the fan wheel, primarily prevents an accidental reaching-in (risk of injury). The requirements with respect to the fan wheel 7 and the driving motor 8 are that the former—while interacting with the fan housing 6—has a high fluidic efficiency, and that the latter has a high electromechanical efficiency in order to optimally utilize the low photovoltaic output. A brushless, electronically commutated direct-current motor is preferably used as the driving motor 8 and is electrically adapted to the solar module without any electronic connecting element. However, a high-quality conventional direct-current motor with brushes may also be used.

On the side of the frame (frame 11), each axial-flow fan 5 is arranged so that it can be angularly moved around a swivel axis Y. The forced control on the part of the roof cover 2 takes place in such a manner that, on the fan-side, a pin indicated in the form of the axis Z or preferably a roller can slide or roll off in the U-rail 4 fixed to the cover. While the construction is largely without play in the area of the axes Y and Z, a defined position of the fan housing 6 and thus of the fan axis therefore corresponds to each angular position of the roof cover 2. As a result, it is possible, by way of the position of the roof cover 2, to influence the flow direction (white arrows) of the axial-flow fans 5 in a limited area. In the shown, maximally opened position, the fan axis X and the flow direction extend approximately in parallel to the plane of the roof cover. The air current coolingly wafts along the thin film 3 and in the process increases its efficiency. The farther the roof cover 2 is closed, the steeper the flow direction will extend downward into the passenger compartment 15. Even before the closed position is reached, it is useful to (automatically) switch off the axial-flow fan 5 because the flow conditions will then become very unfavorable. In the closed position, the axial-flow fans 5 are situated in the roof recess 14 inside the frame 11, the fan axis X extending at a large acute angle (for example, 70°-90°) with respect to the plane of the cover. Even if the fan housing 6 projects slightly downward out of the roof recess 14, the passengers' headroom is only minimally influenced by it.

Concerning the open (maximal) position, it should be pointed out that, in the case of an arrangement of the U-rail 4 at an acute angle to the roof cover 2 and in parallel to the plane of the frame (frame 11), the roof cover 2 can be shifted in the longitudinal direction without any significant change in the position of the fan housing 6.

The illustrated kinematic coupling of the roof cover 2, the fan housing 6 and the frame 11 is naturally only one of several possibilities contemplated by the invention. Articulated levers, tension elements (such as ropes), radial cams, elastic elements (such as springs), etc. may also be used. Thus, partial swivel areas can also be implemented in which a movement of the roof cover 2 is possible without changing the fan position.

The areas of the opening 13 which are not covered by the axial-flow fans 5—particularly when the roof cover is opened completely—must be secured with respect to an unauthorized entering. A movable screening is suitable for this purpose, for example, in the form of grids, perforated plates, etc. made of metal and/or plastic which are arranged specifically in the area between and next to the fan housings 6 and can also be swivelled in this manner. The wedge-shaped lateral areas of the opening 13 may also be protected by means of a movable screening. In addition to its function as a protection against break-in, the screening can also help improve the flow conditions and particularly prevent short-circuit currents in the fan area.

In the case of roof covers according to the invention which are opened and closed by an electric motor, the possibility exists of using the photovoltaically effective film as a cloud sensor. On the one hand, in the case of an extended exceeding of a predetermined photovoltaic output, i.e., in the case of stronger sun radiation, the roof cover can be opened automatically and the fan operation can be started. On the other hand, an opened roof cover can be closed automatically when a predetermined photovoltaic output has not been reached for an extended time, that is, when it becomes cloudy. Naturally, both methods of operation may also be combined.

In this case, a time function element must ensure that short-time changes of the radiation conditions (for example, individual clouds) do not result in a constant repetition of the opening and the closing because, as a rule, the energy for this purpose is taken from the motor vehicle battery and, in addition, the drive of the roof cover will be stressed and worn.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for the ventilation of the passenger compartment of a motor vehicle, particularly a passenger car, having a hinged, or hinged and slidable roof cover of the passenger compartment, having at least one electrically drivable fan in the area of the roof cover for the supply of outside air into the interior of the passenger compartment, as well as having a solar module integrated into the roof cover for the at least one fan, wherein the at least one fan is constructed as an axial-flow fan and is arranged in the area below the rear transverse edge of the roof cover with respect to the normal driving direction, wherein the at least one axial-flow fan has means for kinematically coupling with the roof cover and with the frame carrying the roof cover in such a manner that, when the roof cover is lowered, they are swivelled in a forced manner into an ineffective position in the opening between the roof cover and the frame, and when the roof cover is raised, are forced into an effective position inside the roof recess formed by the roof cover and its frame, each fan axis extending approximately parallel to the plane of the roof cover in the effective position, and extending approximately perpendicular with respect to it in the ineffective position, and wherein the solar module covering the surface of the roof cover at least for the most part is constructed as a semiconductor thin-film which has a transparency for the incident sunlight into the interior of the passenger compartment in at least a locally limited manner.

2. An arrangement according to claim 1, wherein the air flow generated by the at least one axial-flow fan wafts over the solar module effective thin film for the purpose of cooling it.

3. An arrangement according to claim 1, wherein the solar module effective thin film is constructed with amorphous silicon as the semiconductor material and is provided with a plurality of total-spectrally transparent partial surfaces, the proportion of which with respect to the surface of the solar module amounts to approximately 10-30%.

4. An arrangement according to claim 2, wherein the solar module effective thin film is constructed with amorphous silicon as the semiconductor material and is provided with a plurality of total-spectrally transparent partial surfaces, the proportion of which with respect to the surface of the solar module amounts to approximately 10-30%.

5. An arrangement according to claim 1, wherein the direction of the air current generated by the at least one axial-flow fan can be varied in a defined area by changing the angular position of the roof cover.

6. An arrangement according to claim 2, wherein the direction of the air current generated by the at least one axial-flow fan can be varied in a defined area by changing the angular position of the roof cover.

7. An arrangement according to claim 3, wherein the direction of the air current generated by the at least one axial-flow fan can be varied in a defined area by changing the angular position of the roof cover.

8. An arrangement according to claim 1, wherein the openings between the roof cover and the frame which are not blocked by the at least one axial-flow fan in the raised condition of the roof cover, at least for the most part, are secured against unauthorized entering by means of a screening.

9. An arrangement according to claim 2, wherein the openings between the roof cover and the frame which are not blocked by the at least one axial-flow fan in the raised condition of the roof cover, at least for the most part, are secured against unauthorized entering by means of a screening.

10. An arrangement according to claim 4, wherein the openings between the roof cover and the frame which are not blocked by the at least one axial-flow fan in the raised condition of the roof cover, at least for the most part, are secured against unauthorized entering by means of a screening.

11. An arrangement according to claim 7, wherein the openings between the roof cover and the frame which are not blocked by the at least one axial-flow fan in the raised condition of the roof cover, at least for the most part, are secured against unauthorized entering by means of a screening.

12. An arrangement according to claim 1, wherein the driving motor of each axial-flow fan is constructed as a brushless, electronically commutated direct-current motor which is electrically adapted to the solar module without any electronic connecting member.

13. An arrangement according to claim 2, wherein the driving motor of each axial-flow fan is constructed as a brushless, electronically commutated direct-current motor which is electrically adapted to the solar module without any electronic connecting member.

14. An arrangement according to claim 4, wherein the driving motor of each axial-flow fan is constructed as a brushless, electronically commutated direct-current motor which is electrically adapted to the solar module without any electronic connecting member.

15. An arrangement according to claim 11, wherein the driving motor of each axial-flow fan is constructed as a brushless, electronically commutated direct-current motor which is electrically adapted to the solar module without any electronic connecting member.

16. An arrangement according to claim 1, having an electric drive means for the opening and closing of the roof cover, wherein the solar module effective thin film is switched as a cloud sensor and, when a predetermined photovoltaic output has not been reached for an extended period of time, automatically causes the closing of the roof cover.

17. An arrangement according to claim 2, having an electric drive means for the opening and closing of the roof cover, wherein the solar module effective thin film is switched as a cloud sensor and, when a predetermined photovoltaic output has not been reached for an extended period of time, automatically causes the closing of the roof cover.

18. An arrangement according to claim 4, having an electric drive means for the opening and closing of the roof cover, wherein the solar module effective thin film is switched as a cloud sensor and, when a predetermined photovoltaic output has not been reached for an extended period of time, automatically causes the closing of the roof cover.

19. An arrangement according to claim 15, having an electric drive means for the opening and closing of the roof cover, wherein the solar module effective thin film is switched as a cloud sensor and, when a predetermined photovoltaic output has not been reached for an extended period of time, automatically causes the closing of the roof cover.

20. An arrangement to claim 1, wherein the roof cover with the at least one axial-flow fan and possibly with screening is constructed as an exchange part for the roof cover of a conventional glass roof present in a motor vehicle and can be fastened in its frame.

21. An arrangement according to claim 1, wherein a plurality of said fans are provided.

22. An arrangement according to claim 4, wherein a plurality of said fans are provided.

23. An arrangement according to claim 1, wherein four of said fans are provided which are disposed side-by-side across the lateral extent of the rear of the roof cover.

24. An arrangement according to claim 1, wherein the at least one fan is pivotally mounted by a first pivot at the frame connected to a rear lower part of the fan and by a second pivot at the roof cover connected to an upper forward part of the fan.

25. An arrangement according to claim 24, wherein slot guide means are provided at said one of said frame and roof cover to accommodate sliding movement of an associated one of the first and second pivots.

26. An arrangement according to claim 1, having an electric drive means for the opening and closing of the roof cover, wherein the solar module effective thin film is switched as a cloud sensor and, when a predetermined photovoltaic output has been exceeded for an extended period of time, automatically causes the raising of the roof cover.

27. An arrangement according to claim 1, having an electric drive means for the opening and closing of the roof cover, wherein the solar module effective thin film is switched as a cloud sensor and, when a predetermined photovoltaic output has not been reached for an extended period of time, automatically causes the closing of the roof cover and when a predetermined photovoltaic output has been exceeded for an extended period of time, automatically causes the raising of the roof cover.

28. An arrangement according to claim 2, having an electric drive means for the opening and closing of the roof cover, wherein the solar module effective thin film is switched as a cloud sensor and, when a predetermined photovoltaic output has not been reached for an extended period of time, automatically causes the closing of the roof cover and when a predetermined photovoltaic output has been exceeded for an extended period of time, automatically causes the raising of the roof cover.

29. An arrangement according to claim 4, having an electric drive means for the opening and closing of the roof cover, wherein the solar module effective thin film is switched as a cloud sensor and, when a predetermined photovoltaic output has not been reached for an extended period of time, automatically causes the closing of the roof cover and when a predetermined photovoltaic output has been exceeded for an extended period of time, automatically causes the raising of the roof cover.

30. An arrangement according to claim 15, having an electric drive means for the opening and closing of the roof cover, wherein the solar module effective thin film is switched as a cloud sensor and, when a predetermined photovoltaic output has not been reached for an extended period of time, automatically causes the closing of the roof cover and when a predetermined photovoltaic output has been exceeded for an extended period of time, automatically causes the raising of the roof cover.

* * * * *